US011629484B2

(12) United States Patent
Dan et al.

(10) Patent No.: US 11,629,484 B2
(45) Date of Patent: Apr. 18, 2023

(54) WATER OUTLET DEVICE WITH WATER STOP AND FLOW RATE CONTROL

(71) Applicant: Xiamen Solex High-Tech Industries Co., Ltd., Xiamen (CN)

(72) Inventors: Tangjun Dan, Xiamen (CN); Lihong Hu, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 310 days.

(21) Appl. No.: 17/068,990

(22) Filed: Oct. 13, 2020

(65) Prior Publication Data

US 2021/0108398 A1    Apr. 15, 2021

(30) Foreign Application Priority Data

Oct. 12, 2019   (CN) .......................... 201910967663.3

(51) Int. Cl.
*E03C 1/04*   (2006.01)
*B05B 1/30*   (2006.01)

(52) U.S. Cl.
CPC .......... *E03C 1/0404* (2013.01); *B05B 1/3026* (2013.01); *E03C 2001/0415* (2013.01)

(58) Field of Classification Search
CPC .................................................. E03C 1/0404
USPC ... 4/678, 675, 657, 679, 378, 613, 584, 650, 4/668, 671, 680; 137/247.41
See application file for complete search history.

(56) References Cited

U.S. PATENT DOCUMENTS

| 3,940,066 | A  | * | 2/1976  | Hunter ..................... | B05B 15/74 239/582.1 |
| 4,429,422 | A  | * | 2/1984  | Wareham ................. | F16K 19/00 236/12.12 |
| 6,059,200 | A  | * | 5/2000  | Chou ..................... | B05B 1/3006 239/126 |
| 6,264,121 | B1 | * | 7/2001  | McClary ............... | B05B 15/654 239/525 |
| 7,871,020 | B2 | * | 1/2011  | Nelson .................. | E03C 1/0404 239/443 |
| 2007/0170284 | A1 | * | 7/2007  | Nelson .................. | E03C 1/0404 239/443 |
| 2020/0206760 | A1 | * | 7/2020  | Wu ....................... | B05B 1/3013 |
| 2020/0384486 | A1 | * | 12/2020 | Ball ........................ | A47K 3/28 |

* cited by examiner

*Primary Examiner* — Lori L Baker
(74) *Attorney, Agent, or Firm* — Cooper Legal Group, LLC (57) ABSTRACT

A water outlet device with water stop and flow rate control comprises a body, a water stop assembly, and a flow rate control assembly. The body comprises a water outflow passage. The flow rate control assembly and the water stop assembly are disposed on the body, first ends of the water stop assembly and the flow rate control assembly are respectively disposed in the water outflow passage, and second ends of the water stop assembly and the flow rate control assembly are exposed out of the body to respectively define a water stop operation end and a flow rate control end. The water stop assembly comprises a first shaft that is operatively connected to the water stop operation end. The flow rate control assembly comprises a second shaft that is operatively connected to the flow rate control end.

11 Claims, 6 Drawing Sheets

WATER OUTLET DEVICE WITH WATER STOP AND FLOW RATE CONTROL

RELATED APPLICATIONS

This application claims priority to Chinese patent application number 201910967663.3, filed on Oct. 12, 2019. Chinese patent application number 201910967663.3 is incorporated herein by reference.

FIELD OF THE DISCLOSURE

The present disclosure relates to a water outlet device.

BACKGROUND OF THE DISCLOSURE

Kitchen faucets, especially pull-out kitchen faucets, often include showers (e.g., nozzles) that are designed to be held in a user's hand to move around. If the flow rate control, water stop and other control parts of the kitchen faucet are on a fixed portion of the kitchen faucet, such as is common in traditional kitchen faucets, the kitchen faucet is very inconvenient to use. Generally, the functions required for kitchen faucets comprise water outlet switching, water stop, and flow rate control. Due to the volume of the kitchen faucet, the water stop and flow rate control functions cannot be controlled on the kitchen faucet at the same time. Either water stoppage or flow rate is control, but not both, which is very inconvenient for consumers.

BRIEF SUMMARY OF THE DISCLOSURE

The present disclosure provides a water outlet device comprising the two functions of water stop and flow rate control simultaneously.

In order to solve the aforementioned technical problems, the present disclosure provides a water outlet device with water stop and flow rate control.

The water outlet device with water stop and flow rate control comprises a body, a water stop assembly, and a flow rate control assembly. The body comprises a water outflow passage. The flow rate control assembly and the water stop assembly are disposed on the body, first ends of the water stop assembly and the flow rate control assembly are respectively disposed in the water outflow passage, and second ends of the water stop assembly and the flow rate control assembly are exposed out of the body to respectively define a water stop operation end and a flow rate control end. The water stop assembly comprises a first shaft that is operatively connected to the water stop operation end. The flow rate control assembly comprises a second shaft that is operatively connected to the flow rate control end. When the water stop operation end drives the first shaft to move from a second position to a first position, a pressure of a pressure holding chamber disposed in the water stop assembly rises, a sealing member moves to a sealed position, and the water outflow passage is closed. When the flow rate control assembly drives the second shaft to move from a first position to a second position, a water outflow area between the flow rate control assembly and the water outflow passage increases.

In a preferred embodiment, the water outflow passage comprises a flow diverting passage that extends along an axial direction of the first shaft and is in communication with the flow rate control assembly. When the first shaft is in the first position, a water pressure in the pressure holding chamber drives the sealing member to enable the flow diverting passage to be hermetically isolated from a front end of the water outflow passage.

In a preferred embodiment, an axis of the first shaft and an axis of the second shaft are coaxial, and the first shaft and the second shaft are symmetrically disposed relative to a central axis of the body.

In a preferred embodiment, the water stop assembly further comprises a constant-open water inlet in communication with a water inlet end of the water outflow passage, and the constant-open water inlet is in communication with the pressure holding chamber.

In a preferred embodiment, the first shaft passes through the sealing member. The first shaft comprises a first portion and a second portion, and an outer diameter of the first portion is greater than that an outer diameter of the second portion. When the first shaft is in the first position, the first portion hermetically contacts with the sealing member. When the first shaft is in the second position, the first portion is separated from the sealing member, and water in the pressure holding chamber flows out through a gap disposed between the second portion and the sealing member.

In a preferred embodiment, the sealing member is a pilot diaphragm. An axial center of the sealing member is disposed with an opening configured to enable the first shaft to pass through. The sealing member is further disposed with a sealing ring at a position of the opening. When the first shaft is in the first position, the first portion hermetically contacts with the sealing ring.

In a preferred embodiment, the water stop assembly further comprises a press cover configured to be fixed with the pilot diaphragm. A side surface of the press cover is disposed with the constant-open water inlet. The press cover, the first shaft, and the pilot diaphragm cooperate to define the pressure holding chamber.

In a preferred embodiment, the flow rate control assembly further comprises a water restrictor sheet operatively connected to the second shaft and further comprises a water passing body. The water restrictor sheet comprises a water passing hole. The water passing body comprises a water inlet end and a water outlet end. When the second shaft is in the first position, the water restrictor sheet is hermetically connected to the water inlet end, and water flows through the water passing hole to the water outlet end. When the second shaft is in the second position, the water restrictor sheet is separated from the water inlet end, and the water flows through the water passing hole and the water inlet end to the water outlet end.

In a preferred embodiment, the body is disposed with a water outlet cover at an end of the water outflow passage, and the water outlet cover comprises an aerator disposed on an axial center of the water outlet cover and a shower water outlet hole disposed on a periphery of the aerator.

In a preferred embodiment, an inner side of the body is disposed with a water dividing body and a switching shaft. A first end of the water dividing body is in communication with the water outlet end of the water passing body, and the switching shaft is used to enable a second end of the water dividing body to be in communication with one of the aerator or the shower water outlet hole.

In a preferred embodiment, the water outlet device is a kitchen faucet.

Compared with the existing techniques, the technical solution has the following advantages.

The present disclosure provides a water outlet device with water stop and flow rate control. Through the water stop assembly and the flow rate control assembly, the water stop function and the flow rate control function are realized, and through specific settings, the two components are symmetrically arranged on the body. The structure is therefore compact and user-friendly.

DETAILED DESCRIPTION OF THE EMBODIMENTS

The present disclosure will be further described below in combination with the accompanying drawings and embodiments.

Referring to FIGS. 1-6, the present disclosure provides a water outlet device with a water stop and a flow rate control. In this embodiment, the water outlet device is a kitchen faucet and comprises a body 1, a water stop assembly 2, and a flow rate control assembly 3.

The body 1 comprises a water outflow passage 11, and the water stop assembly 2 and the flow rate control assembly 3 are disposed on the body 1. The water stop assembly 2 and the flow rate control assembly 3 can be disposed on two sides relative to a central axis of the body 1, and an axis of the water stop assembly 2 and an axis of the flow rate control assembly 3 are preferably coaxial. In this embodiment, the axis of the water stop assembly 2 and the axis of the flow rate control assembly 3 are coaxial. First ends of the water stop assembly 2 and the flow rate control assembly 3 are respectively disposed in the water outflow passage 11, and second ends of the water stop assembly 2 and the flow rate control assembly 3 are exposed out of the body 1 (i.e., are disposed outside of the body 1) to respectively define a water stop operation end 21 and a flow rate control end 31. In this embodiment, the water stop operation end 21 and the flow rate control end 31 are respectively a button.

Figure 1:
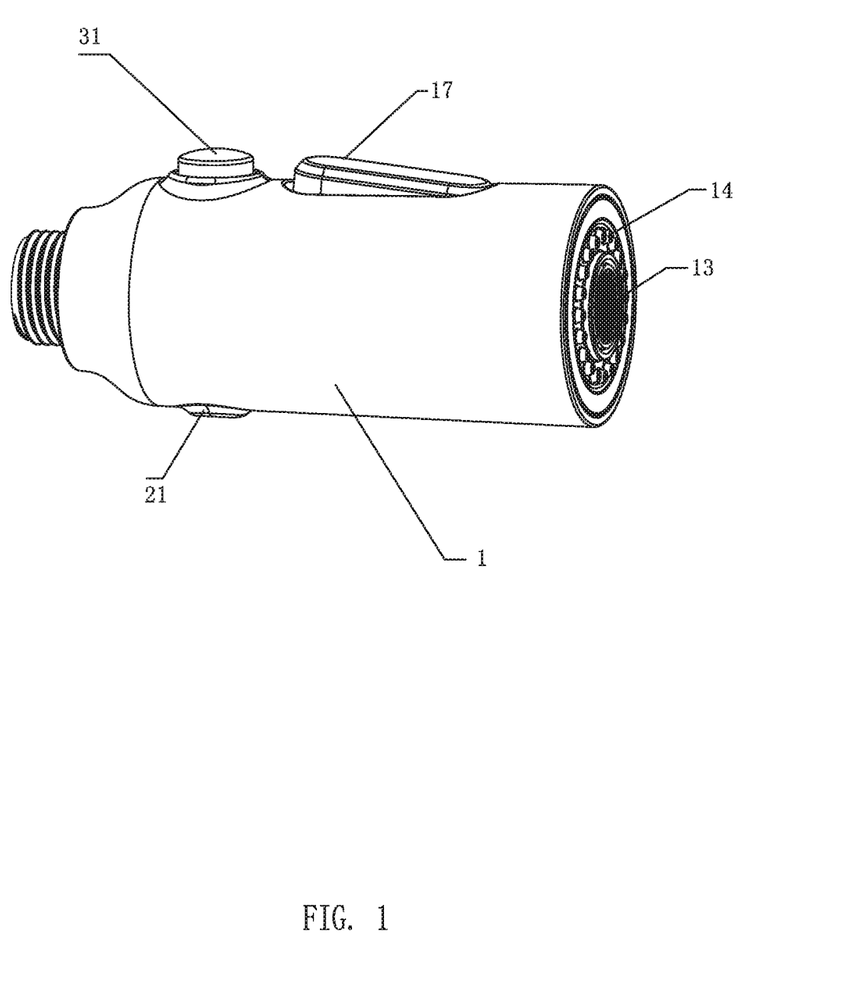
FIG. 1 illustrates a perspective view of a kitchen faucet of an embodiment of the present disclosure.
Figure 2:
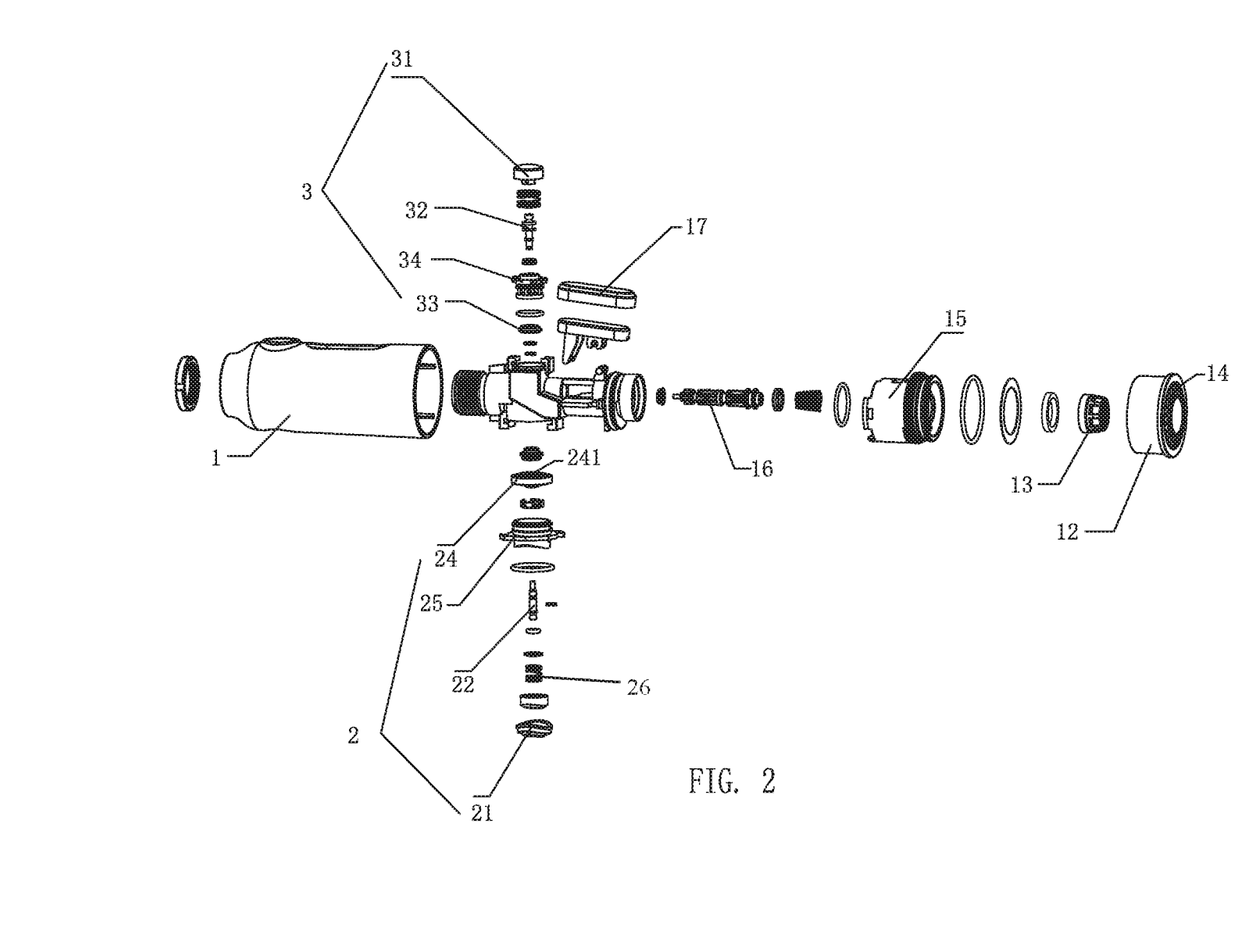
FIG. 2 illustrates an exploded view of the kitchen faucet of the embodiment of the present disclosure.
Figure 3:
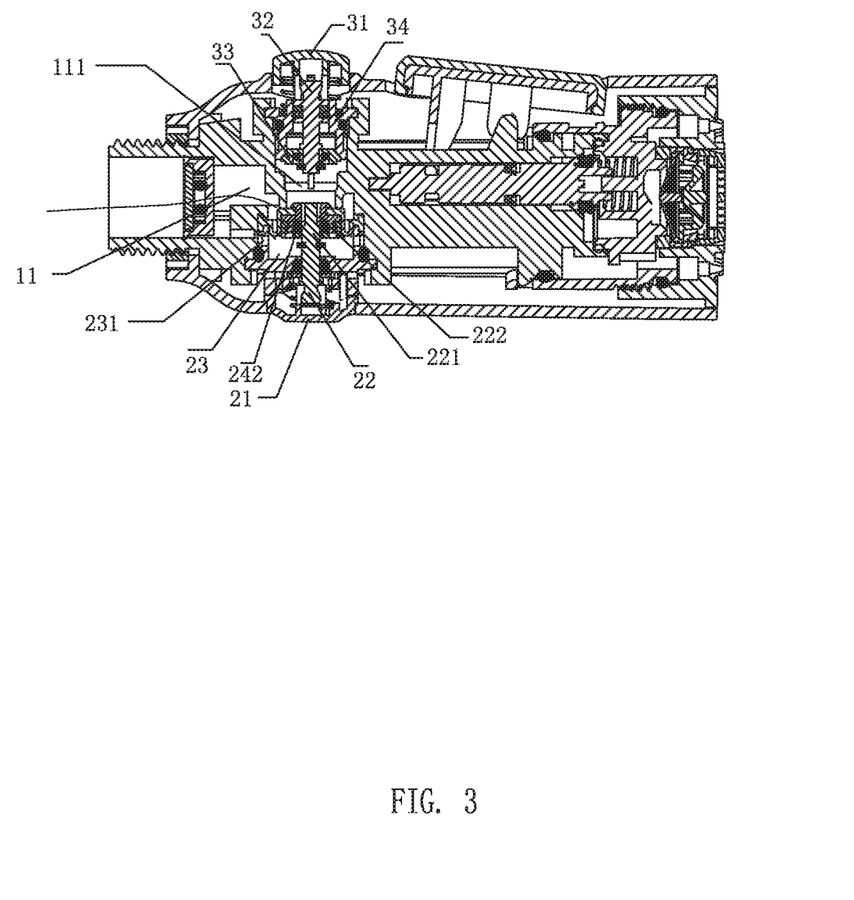
FIG. 3 illustrates a cross-sectional view of the kitchen faucet of the embodiment of the present disclosure in a water stop state.

The water stop assembly 2 comprises a first shaft 22 that is operatively connected to the water stop operation end 21, and the flow rate control assembly 3 comprises a second shaft 32 that is operatively connected to the flow rate control end 31.

The water stop assembly 2 comprises an elastic member 26. The elastic member 26 abuts and is disposed between the water stop operation end 21 and a press cover 25. The first shaft 22 is operatively connected to the water stop operation end 21. When the water stop operation end 21 is not being operated (e.g., is not pressed), the elastic member 26 is in an initial state, and the first shaft 22 is maintained in a second position. When the water stop operating end 21 is pressed, the first shaft 22 moves from the second position to a first position, and the elastic member 26 is in a compressed state.

When the water stop operation end 21 drives the first shaft 22 to move from the second position to the first position, a pressure of a pressure holding chamber 23 disposed in the water stop assembly 2 rises, a sealing member 24 moves to a sealed position, and the water outflow passage 11 is closed.

Figure 5:
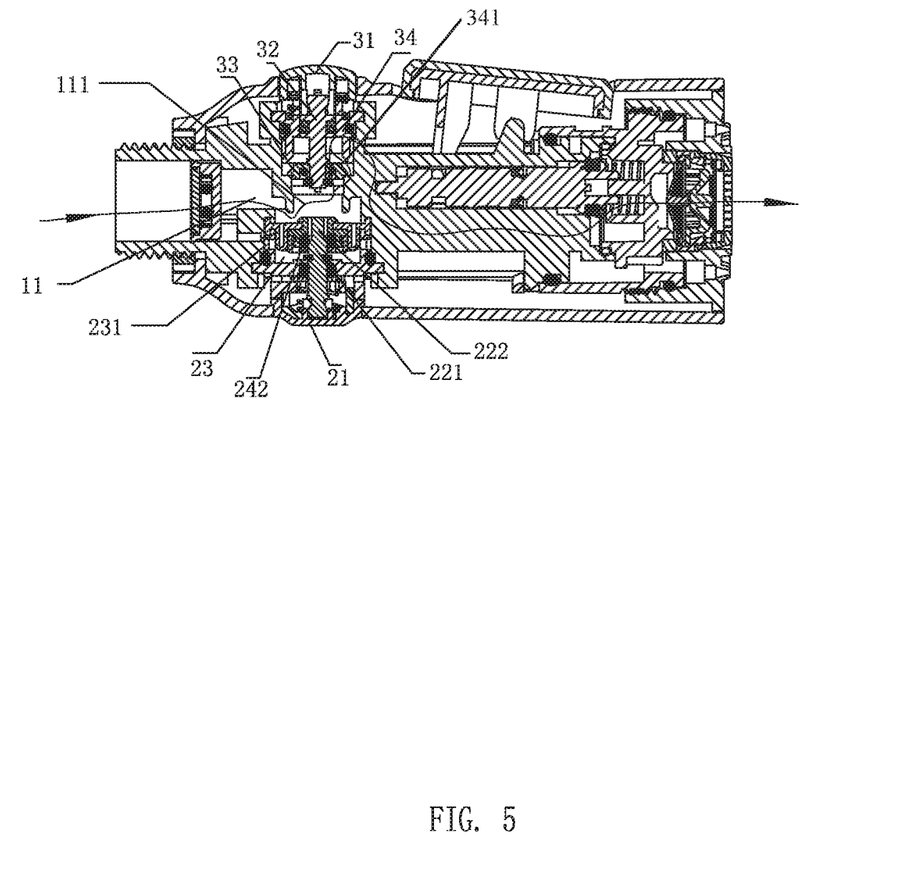
FIG. 5 illustrates a cross-sectional view of the kitchen faucet of the embodiment of the present disclosure in an aerated water state with a large flow rate.

When the flow rate control assembly 3 drives the second shaft 32 to move from a first position to a second position, and a water outflow area between the flow rate control assembly 3 and the water outflow passage 11 increases.

Therefore, when the user needs to shutoff the kitchen faucet temporarily, the user only needs to press the water stop operation end 21, and the kitchen faucet will stop discharging water. When large flow rate water is required, the user only needs to release the water stop operating end 21 and then press the flow rate control end 31 to switch to the large flow rate water (as further described below). The operation is very simple.

In this embodiment, in order to facilitate the user operating the water stop operation end 21 and the flow rate control end 31, the water outflow passage 11 comprises a flow diverting passage 111 that extends along an axial direction of the first shaft 22 and is in communication with the flow rate control assembly 3.

When the first shaft 22 is in the first position, a water pressure in the pressure holding chamber 23 drives the sealing member 24 to enable the flow diverting passage 111 to be hermetically isolated from a front end of the water outflow passage 11. The flow diverting passage 111 extends along the axial direction of the first shaft 22 and is in communication with the flow rate control assembly 3. The second shaft 32 can also extend along the axial direction of the first shaft 22, so that the axis of the first shaft 22 and the axis of the second shaft 32 are coaxial, and the first shaft 22 and the second shaft 32 can be symmetrically disposed relative to the central axis of the body 1. Therefore, when the user holds the kitchen faucet, the thumb and the index finger can be naturally placed on the water stop operation end 21 and the flow rate control end 31, which facilitates the user carrying out pressing operations.

In order to achieve a water stop effect of the water stop assembly 2, the water stop assembly 2 comprises a constant-open water inlet 231 in communication with a water inlet end of the water outflow passage 11. The constant-open water inlet 231 is in communication with the pressure holding chamber 23. In this way, water will flow from the water outflow passage 11 into the pressure holding chamber 23. As long as the remaining positions of the pressure holding chamber 23 are in a sealed state, the water pressure in the pressure holding chamber 23 will increase, and the sealing member 24 will be pushed to move along the axial direction of the first shaft 22 to a sealed position. Therefore, the flow diverting passage 111 is hermetically isolated from the front end of the water outflow passage 11. To achieve a water flowing effect of the water stop assembly 2, the pressure holding chamber 23 needs to be in an opened state. While in the opened state, the water in the pressure holding chamber 23 will flow out of the pressure holding chamber 23, the water pressure in the pressure holding chamber 23 will decrease, and the sealing member 24 will be moved from the sealed position.

Therefore, according to the above analysis, when the first shaft 22 is in the first position, the remaining positions of the pressure holding chamber 23 should be in a sealed state except for the constant-open water inlet 231. When the first shaft 22 is in the second position, the constant-open water inlet 231 and the remaining positions of the pressure holding chamber should be in an opened state.

Figure 4:
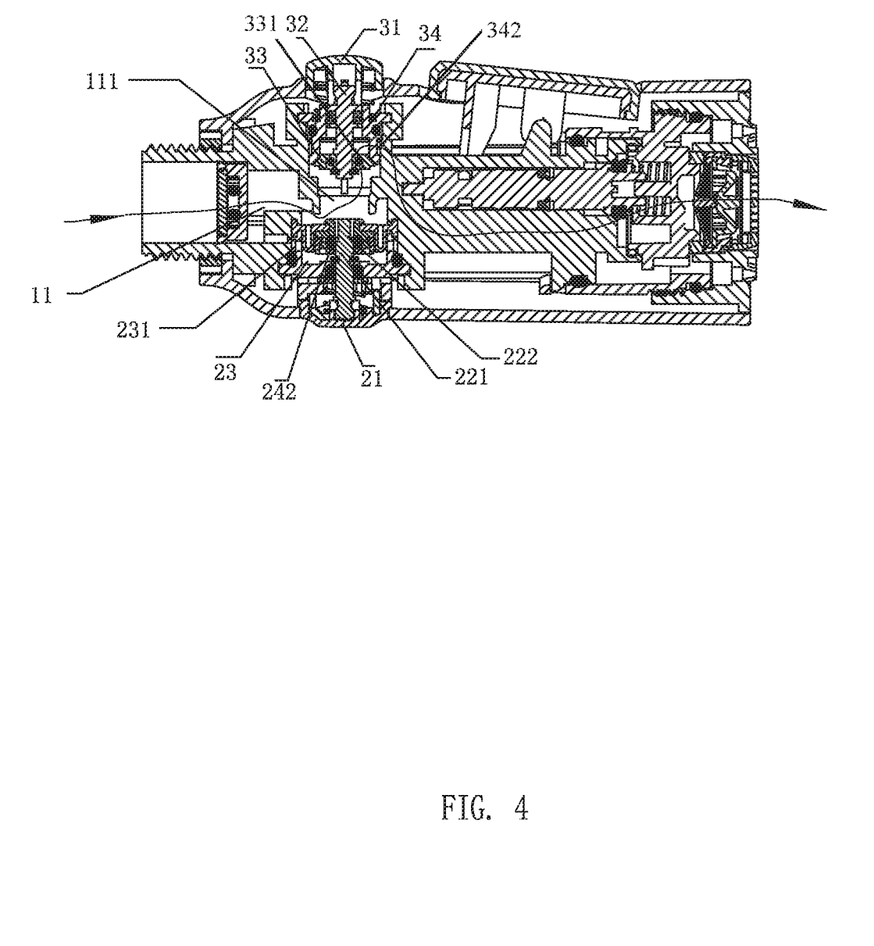
FIG. 4 illustrates a cross-sectional view of the kitchen faucet of the embodiment of the present disclosure in an aerated water state with a normal flow rate.

In order to achieve the aforementioned effect, the first shaft 22 passes through the sealing member 24, and the first shaft 22 comprises a first portion 221 and a second portion 222. An outer diameter of the first portion 221 is greater than an outer diameter of the second portion 222. When the first shaft 22 is in the first position, the first portion 221 hermetically contacts with the sealing member 24. When the first shaft 22 is in the second position, the first portion 221 is separated from the sealing member 24, and the water in the pressure holding chamber 23 flows out through a gap disposed between the second portion 222 and the sealing member 24.

In some embodiments, the sealing member 24 is a pilot diaphragm. An axial center of the sealing member 24 is disposed with an opening 241 configured to enable the first shaft 22 to pass through, and the sealing member 24 is further disposed with a sealing ring 242 at a position of the opening 241. When the first shaft 22 is in the first position, the first portion 221 hermetically contacts with the sealing ring 242.

In this embodiment, the water stop assembly 2 further comprises the press cover 25, and the press cover 25 is configured to be fixed with the pilot diaphragm. A side surface of the press cover 25 is disposed with the constant-open water inlet 231. The press cover 25, the first shaft 22, and the pilot diaphragm cooperate to define the pressure holding chamber 23.

After the above design is manufactured, when the first shaft 22 is in the first position, the water pressure in the pressure holding chamber 23 drives a portion of the pilot diaphragm to expand in a direction away from the pressure holding chamber 23, causing the pilot diaphragm to abut and seal the water outflow passage 11. After the water stop operating end 21 is released, the elastic member 26 drives the first shaft 22 from the first position to the second position, the water pressure in the pressure holding chamber 23 decreases, the sealing member 24 leaves the sealed position, and the water outflow passage 11 is opened to discharge water.

A structure of the flow rate control assembly 3 is further described as follows. The flow rate control assembly 3 further comprises a water restrictor sheet 33 operatively connected to the second shaft 32, and the flow rate control assembly 3 further comprises a water passing body 34. The water restrictor sheet 33 comprises a water passing hole 331. The water passing body 34 comprises a water inlet end 341 and a water outlet end 342. The water inlet end 341 is disposed on an end of the water passing body 34 along an axial direction of the second shaft 32.

When the second shaft 32 is in the first position, the water restrictor sheet 33 is hermetically connected to the water inlet end 341, and water flows to the water outlet end 342 through the water passing hole 331. When the second shaft 32 is in the second position, the water restrictor sheet 33 is separated from the water inlet end 341, and the water flows to the water outlet end 342 through the water passing hole 331 and the water inlet end 341. Therefore, in these two states, water passing areas of the water inlet end are different, and water flow rates of the kitchen faucet are obviously different.

Figure 6:
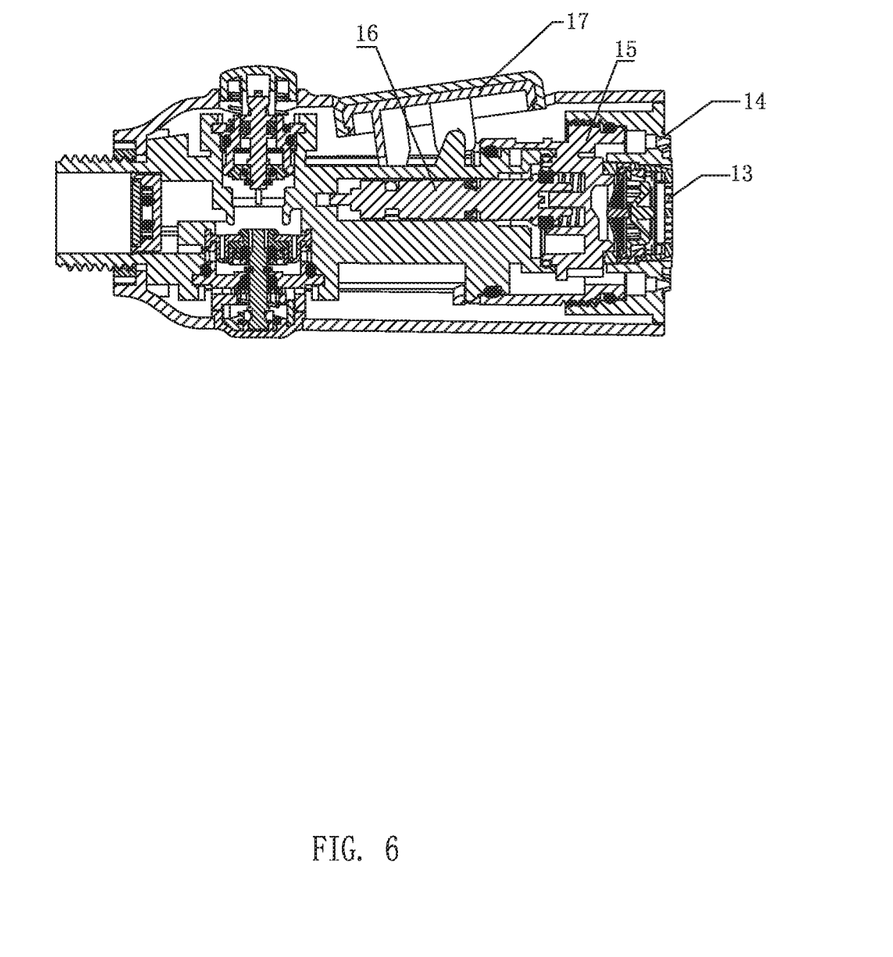
FIG. 6 illustrates a cross-sectional view of the kitchen faucet of the embodiment of the present disclosure when the kitchen faucet is switched to discharge shower water.

For kitchen faucets, a single water spray does not always meet the requirements of users. When in daily use, aerated water is often required. When stubborn stains need to be washed away, shower water with stronger flushing power is often required. Therefore, the kitchen faucets also need to have the above two modes of water sprays. In this embodiment, the body 1 is disposed with a water outlet cover 12 at an end of the water outflow passage 11, and the water outlet cover 12 comprises an aerator 13 disposed on an axial center of the water outlet cover 12 and a shower water outlet hole 14 disposed on a periphery of the aerator 13.

In order to switch between aerator water and shower water, an inner side of the body 1 is also disposed with a water dividing body 15 and a switching shaft 16, and a surface of the body 1 is also disposed with a switch 17 configured to control the switching shaft 16 to move along an axial direction of the switching shaft 16. A first end of water dividing body 15 is in communication with the water outlet end 342 of the water passing body 34, and the switching shaft 16 is used to enable a second end of the water dividing body 15 to be in communication with one of the aerator 13 or the shower water outlet hole 14. The water spray switching of the kitchen faucet is conventional and is only briefly described in this embodiment, and those skilled in the art can use the existing structure of the existing art to achieve the water spray switching.

The aforementioned embodiments are merely some embodiments of the present disclosure, and the scope of the disclosure of is not limited thereto. Thus, it is intended that the present disclosure cover any modifications and variations of the presently presented embodiments provided they are made without departing from the appended claims and the specification of the present disclosure.

What is claimed is:

1. A water outlet device with water stop and flow rate control, comprising:
   a body,
   a water stop assembly, and
   a flow rate control assembly, wherein:
     the body comprises a water outflow passage,
     the flow rate control assembly and the water stop assembly are disposed on the body,
     first ends of the water stop assembly and the flow rate control assembly are respectively disposed in the water outflow passage,
     second ends of the water stop assembly and the flow rate control assembly are exposed out of the body to respectively define a water stop operation end and a flow rate control end,
     the water stop assembly comprises a first shaft operatively connected to the water stop operation end,
     the flow rate control assembly comprises a second shaft operatively connected to the flow rate control end,
     when the water stop operation end drives the first shaft to move from a second position to a first position:
       a pressure of a pressure holding chamber disposed in the water stop assembly rises,
       a sealing member moves to a sealed position, and the water outflow passage closes, and
     when the flow rate control assembly drives the second shaft to move from a first position to a second position:
       a water outflow area between the flow rate control assembly and the water outflow passage increases.

2. The water outlet device with water stop and flow rate control according to claim 1, wherein:
   the water outflow passage comprises a flow diverting passage that extends along an axial direction of the first shaft and is in fluid communication with the flow rate control assembly, and
   when the first shaft is in the first position,
     a water pressure in the pressure holding chamber drives the sealing member such that the flow diverting passage is hermetically isolated from a front end of the water outflow passage.

3. The water outlet device with water stop and flow rate control according to claim 2, wherein:
an axis of the first shaft and an axis of the second shaft are coaxial, and
the first shaft and the second shaft are symmetrically disposed relative to a central axis of the body.

4. The water outlet device with water stop and flow rate control according to claim 3, wherein:
the water stop assembly further comprises a constant-open water inlet in fluid communication with a water inlet end of the water outflow passage, and
the constant-open water inlet is in fluid communication with the pressure holding chamber.

5. The water outlet device with water stop and flow rate control according to claim 4, wherein:
the first shaft passes through the sealing member,
the first shaft comprises a first portion and a second portion,
an outer diameter of the first portion is greater than that an outer diameter of the second portion,
when the first shaft is in the first position:
the first portion hermetically contacts the sealing member, and
when the first shaft is in the second position:
the first portion is separated from the sealing member, and
water in the pressure holding chamber flows out through a gap disposed between the second portion and the sealing member.

6. The water outlet device with water stop and flow rate control according to claim 5, wherein:
the sealing member is a pilot diaphragm,
an axial center of the sealing member is disposed with an opening configured to enable the first shaft to pass through,
the sealing member is further disposed with a sealing ring at a position of the opening, and
when the first shaft is in the first position:
the first portion hermetically contacts the sealing ring.

7. The water outlet device with water stop and flow rate control according to claim 6, wherein:
the water stop assembly further comprises a press cover configured to be fixed with the pilot diaphragm,
a side surface of the press cover is disposed with the constant-open water inlet, and
the press cover, the first shaft, and the pilot diaphragm cooperate to define the pressure holding chamber.

8. The water outlet device with water stop and flow rate control according to claim 1, wherein:
the flow rate control assembly further comprises a water restrictor sheet operatively connected to the second shaft and further comprises a water passing body,
the water restrictor sheet comprises a water passing hole,
the water passing body comprises a water inlet end and a water outlet end,
when the second shaft is in the first position:
the water restrictor sheet is hermetically connected to the water inlet end, and
water to flows through the water passing hole to the water outlet end, and
when the second shaft is in the second position:
the water restrictor sheet is separated from the water inlet end, and
the water flows through the water passing hole and the water inlet end to the water outlet end.

9. The water outlet device with water stop and flow rate control according to claim 8, wherein:
the body is disposed with a water outlet cover at an end of the water outflow passage, and
the water outlet cover comprises an aerator disposed on an axial center of the water outlet cover and a shower water outlet hole disposed on a periphery of the aerator.

10. The water outlet device with water stop and flow rate control according to claim 9, wherein:
an inner side of the body is disposed with a water dividing body and a switching shaft,
a first end of the water dividing body is in fluid communication with the water outlet end of the water passing body, and
the switching shaft is used to enable a second end of the water dividing body to be in fluid communication with one of the aerator or the shower water outlet hole.

11. The water outlet device with water stop and flow rate control according to claim 10, wherein the water outlet device is a kitchen faucet.

* * * * *